US012620761B2

(12) United States Patent
Heubusch et al.

(10) Patent No.: US 12,620,761 B2
(45) Date of Patent: May 5, 2026

(54) CONNECTION ASSEMBLY AND CONTROL DEVICE

(71) Applicant: AUMOVIO Autonomous Mobility Germany GmbH, Ingolstadt (DE)

(72) Inventors: Stefan Heubusch, Buch (DE); Daniel Egger, Bernstadt (DE)

(73) Assignee: AUMOVIO Autonomous Mobility Germany GmbH, Ingolstadt (DE)

( * ) Notice: Subject to any disclaimer, the term of this patent is extended or adjusted under 35 U.S.C. 154(b) by 220 days.

(21) Appl. No.: 18/261,490

(22) PCT Filed: Nov. 30, 2021

(86) PCT No.: PCT/DE2021/200224

§ 371 (c)(1),
(2) Date: Jul. 14, 2023

(87) PCT Pub. No.: WO2022/152344

PCT Pub. Date: Jul. 21, 2022

(65) Prior Publication Data

US 2024/0405485 A1 Dec. 5, 2024

(30) Foreign Application Priority Data

Jan. 14, 2021 (DE) ........................ 10 2021 200 309.

(51) Int. Cl.
*H01R 13/6584* (2011.01)
*H01R 13/652* (2006.01)
*H01R 13/6592* (2011.01)

(52) U.S. Cl.
CPC ....... *H01R 13/6584* (2013.01); *H01R 13/652* (2013.01); *H01R 13/6592* (2013.01); *H01R 2201/26* (2013.01)

(58) Field of Classification Search
CPC .............. H01R 13/6584; H01R 13/652; H01R 13/6592; H01R 2201/26
(Continued)

(56) References Cited

U.S. PATENT DOCUMENTS 4,536,045 A 8/1985 Reichardt et al.
5,120,258 A 6/1992 Carlton
(Continued)

FOREIGN PATENT DOCUMENTS

CN 110692169 A 1/2020
DE 3201142 A1 3/1984
(Continued)

OTHER PUBLICATIONS

German Search Report dated Sep. 29, 2021, for the counterpart German Patent Application No. 10 2021 200 309.5.
(Continued)

*Primary Examiner* — Gary F Paumen

(57) ABSTRACT

A terminal assembly, comprising a terminal connector having a shield, a grounding part, in particular a housing, and a connection device which is arranged in order to capacitively connect the shield and the grounding part, wherein the connection device contacts the shield and the grounding part, and the connection device comprises a first electrically conductive contact and a second insulating contact, wherein one contact contacts the shield and one contact contacts the grounding part.

9 Claims, 4 Drawing Sheets

(58) Field of Classification Search
USPC ........................................................ 439/98
See application file for complete search history.

(56) References Cited

U.S. PATENT DOCUMENTS

| | | | | |
|---|---|---|---|---|
| 5,417,591 | A | 5/1995 | Demmler | |
| 5,691,506 | A * | 11/1997 | Miyazaki | H01R 4/646 439/98 |
| 7,597,563 | B2 * | 10/2009 | Shinkawa | H01R 4/646 439/98 |
| 7,988,465 | B2 * | 8/2011 | Chuo | H05K 1/117 439/98 |
| 2013/0072041 | A1 * | 3/2013 | Nonen | H01R 13/65915 439/98 |
| 2018/0198967 | A1 * | 7/2018 | Pfeiffer | H04N 7/10 |

FOREIGN PATENT DOCUMENTS

| | | | |
|---|---|---|---|
| EP | 3667836 | A1 | 6/2020 |
| JP | 2000277219 | A | 10/2000 |

OTHER PUBLICATIONS

He International Search Report and the Written Opinion of the International Searching Authority mailed on Feb. 23, 2022, for the counterpart PCT Application No. PCT/DE2021/200224.
First Office Action dated Dec. 23, 2025 for the counterpart Chinese Patent Application No. 202180089595.0 and machine translation of same.

* cited by examiner

CONNECTION ASSEMBLY AND CONTROL DEVICE

CROSS-REFERENCE TO RELATED APPLICATIONS

The present application is a National Stage Application under 35 U.S.C. § 371 of International Patent Application No. PCT/DE2021/200224 filed on Nov. 30, 2021, and claims priority from German Patent Application No. 10 2021 200 309.5 filed on Jan. 14, 2021, in the German Patent and Trademark Office, the disclosures of which are herein incorporated by reference in their entireties.

BACKGROUND

1. Field

Embodiments of the present application relate to a terminal assembly in which a capacitive connection exists between a terminal connector or the connector shield of the terminal connector and a grounding part or a housing, e.g., of a control apparatus, as well as a control apparatus which has a terminal assembly.

2. Description of Related Art

Modern means of transport such as motor vehicles or motorcycles are increasingly being equipped with driver assistance systems which, with the aid of sensor systems, detect the surroundings, recognize a traffic situation and support the driver, e.g., by a braking or steering intervention or by outputting a visual or acoustic warning. Ultrasonic sensors, camera sensors, surround-view cameras, radar sensors, lidar sensors or the like are regularly deployed as sensor systems for detecting the surroundings. Conclusions can subsequently be drawn about the surroundings from the sensor data established by the sensors, by means of which assistance functions for supporting the driver during parking and/or driving maneuvers can be implemented. The control of such sensors as well as the further processing of the produced sensor data are nowadays carried out by means of complex electronic control units such as, e.g., ECU, Electronic Control Unit or ADCU, Assisted and Automated Driving Control Unit.

Generic control units are, for the most part, installed directly on the vehicle bodywork. In this case, it is not necessary, as a general rule, for the housing of the control unit to have a DC connection, but rather a capacitive connection with a connector shield and the ground (GND) of the circuit board of the control unit. The connector shield is, as a general rule, capacitively connected to the housing via the printed circuit board (PCB) of the control unit, i.e., via components on the printed circuit board such as capacitors. Multiple parallel capacitances or capacitors (e.g., multilayer ceramic capacitors, MLCC,) can also be arranged in order to establish the capacitive connection. However, the problem in this case with high-speed transitions or connections which work, e.g., with data rates of >1 GHz is that the impedance of the shield connection of the plug connector must be very low, wherein a capacitive connection with capacitances or capacitors (MLCCs) arranged on the printed circuit board has a comparatively high impedance.

A plug connector for a shielded cable which has a shield connecting element which is connected, on the one hand, with the cable shield and has a housing contact part which is arranged lying in contact with a part lying on the ground potential or the reference potential, e.g., the connector housing, is known from DE 32 011 42 A1. The housing contact part can be arranged resiliently so that it establishes a good contact on the inner wall of the housing. DE 32 011 42 A1 already shows that it is frequently necessary to shield signal cables against electromagnetic radiations. For this purpose, the cables leading to the plug connector are provided with a metallic shield which is connected in an electrically conductive manner via the plug connector, for example, with the housing of the device.

SUMMARY

Aspects of embodiments of the present application relate to an assembly with which an improved connection is achieved between the connector and the housing, and with which the problems known from the prior art are overcome in a simple and inexpensive manner.

According to an aspect of an embodiment, a terminal assembly can be used for a control unit, a sensor or the like and comprises a terminal connector to which a terminal plug or connection cable can be attached. The terminal assembly has a shield or connector shield in order to shield the terminal or the cable. Furthermore, a grounding part is provided, in particular the housing of the control apparatus, and a connection device which is arranged in order to capacitively connect the shield and the grounding part, wherein the connection device contacts the shield and the grounding part. The connection device comprises a first electrically conductive contact and a second insulating contact, wherein one contact contacts the shield and one contact contacts the grounding part. In particular, the term "contacts" within the meaning of the embodiment is to be understood to be a direct contact and an indirect contact within the meaning of a galvanic connection, i.e., by way of example, via a conductive film, layer, conductive paste or the like located therebetween. An in particular low-impedance, capacitive (plug) connection between the connector shield and the grounding part or housing is created in a simple and inexpensive manner by such an assembly.

The connection device can advantageously contact the shield via the first electrically conductive contact and the grounding part via the second insulating contact. Alternatively, it can also be provided that the connection device contacts the grounding part via the first electrically conductive contact and contacts the shield via the second insulating contact.

The connection device is preferably configured as a resilient element, e.g., as a spring or a gasket (a foam pad having a conductive coating). This results in the advantage that the spring can be easily inserted e.g., into the housing or a housing part of the control apparatus during installation and is then arranged in the target position by the mounting process (arranging two or more housing parts in one another or on one another). The spring force of the spring is utilized in order to press the connection device against the contact surfaces or against the housing and shield in order to create a permanent and secure contact on both contacts. Alternatively, the connection device can also be fixed in the housing.

According to an aspect of an embodiment, the connection device comprises an insulation pad which is provided as the second insulating contact. The insulation pad can be arranged in a simple manner on the connection device, e.g., by pressing, gluing, riveting, vapor deposition or the like.

The insulation pad preferably comprises a first electrically conductive layer which is provided as the first contact and a second insulating layer which is provided as the second contact.

The connection device can expediently have a body, wherein the body is either electrically conductive and one side of the body is provided as the first contact, and an insulating surface, film or layer is arranged on the opposite side of the body which serves as the second insulating contact or the body is configured to be non-electrically conductive or insulating (e.g., produced from plastic or ceramic), so that one side of the body is provided as the second contact, and a surface, film or layer is arranged on the opposite side of the body, which serves as the first contact.

Moreover, the insulating layer can also be designed by forming the body of the connection device from electrically conductive material (e.g., metal) and applying the insulating layer by varnishing, so to speak, as a varnish or paint. Furthermore, the body of the connection device can also be produced from non-electrically conductive material, in particular plastic, wherein the insulating layer is applied by varnishing.

It can expediently also be provided that the second insulating contact or the insulation film is/are formed as a result of the process, e.g., by an injection-molding process, in particular by injection molding conductive plastic.

According to an aspect of an embodiment, there is provided a control apparatus which comprises a terminal assembly. If the control apparatus or the control unit has multiple shielded connectors, the shields thereof can also be capacitively connected in a simple manner via a connection device to the housing (for example, all or, in each case, multiple shields can be capacitively connected via a joint connection device to the housing).

BRIEF DESCRIPTION OF THE DRAWINGS

Embodiments of the present application are explained in greater detail below with reference to the drawings, wherein.

DETAILED DESCRIPTION

Figure 1:
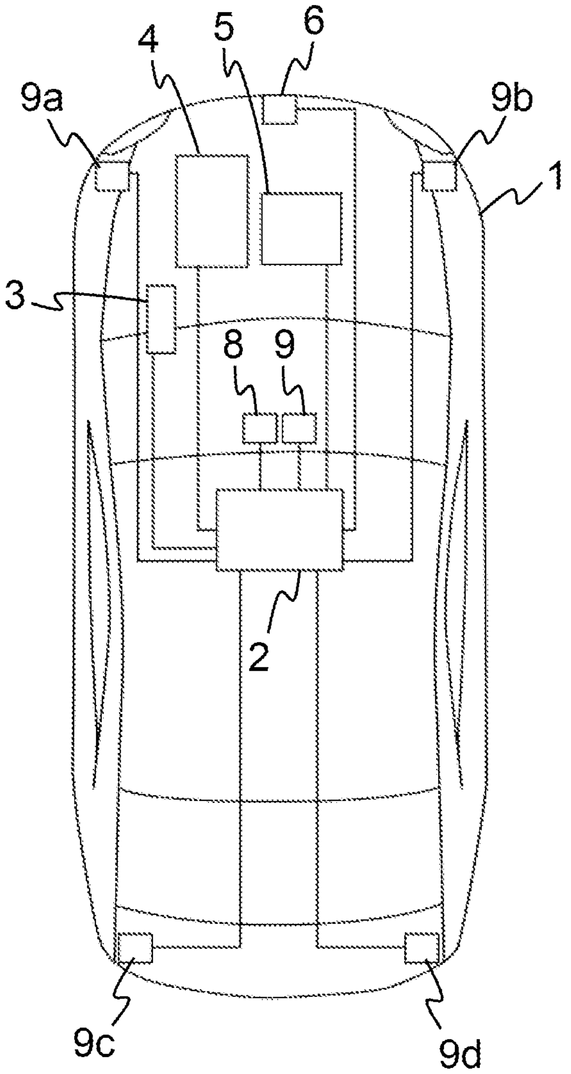
FIG. 1 shows a simplified schematic diagram of a vehicle which has a control apparatus according to the embodiment.

Reference numeral 1 in FIG. 1 designates a vehicle or a vehicle having various actuators (steering 3, engine 4, brake 5), which has a control apparatus 2 (ECU, Electronic Control Unit or ADCU, Assisted and Automated Driving Control Unit), by which the vehicle 1 can be controlled in a (partially) automated manner or supporting driving functions can be executed in that the control apparatus 2 can access the actuators. Furthermore, the vehicle 1 has sensors for detecting the environment (camera 6, lidar sensor 7, radar sensor 8 as well as ultrasonic sensors 9*a*-9*d*), the sensor data of which can be utilized for recognizing the environment and objects so that various assistance functions such as, e.g., a parking assistant, Electronic Brake Assist (EBA), Adaptive Cruise Control (ACC), a lane-keeping control system or a lane departure warning system (LKA, Lane Keep Assist) or the like can be implemented. The assistance functions are executed via the control apparatus 2 or the algorithm stored therein.

Figure 2:
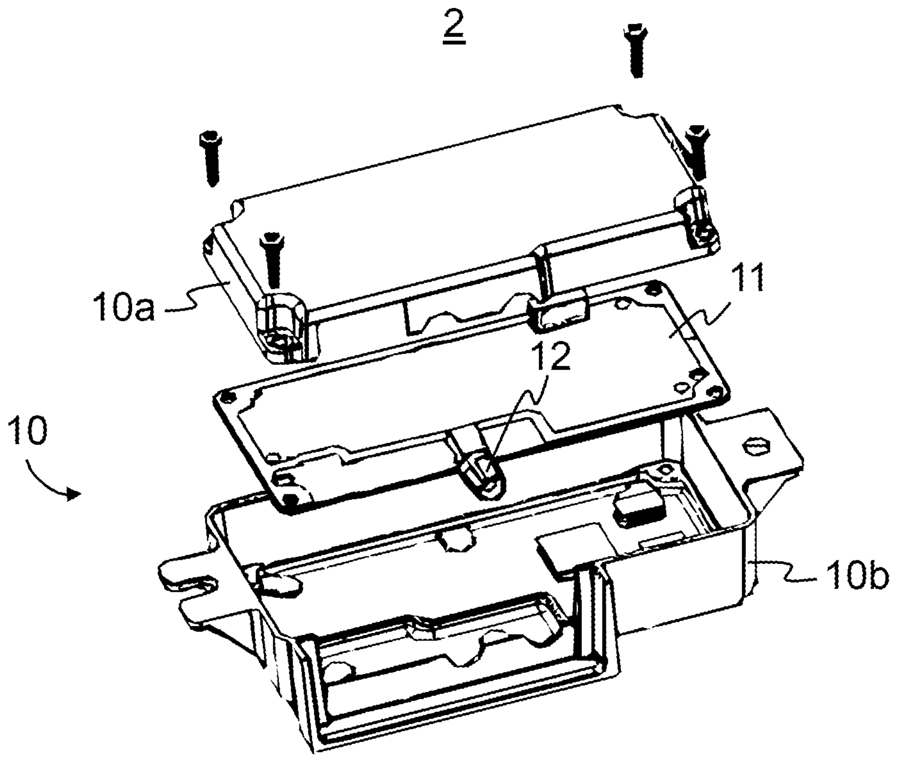
FIG. 2 shows a simplified 3D diagram of a configuration of a control apparatus.

An exploded diagram of a control device 2 is depicted in FIG. 2. The control apparatus 2 comprises a housing 10 which is deployed as a grounding part. The housing has a two-part construction with an upper shell 10*a* and a lower shell 10*b*, which can be arranged, e.g., plugged, in(to) one another during installation. Furthermore, a circuit board 11 or printed circuit board is provided, on which a terminal connector 12 is arranged, by means of which the control apparatus 2 can be connected to other electronic components of the vehicle 1.

Figure 3A:
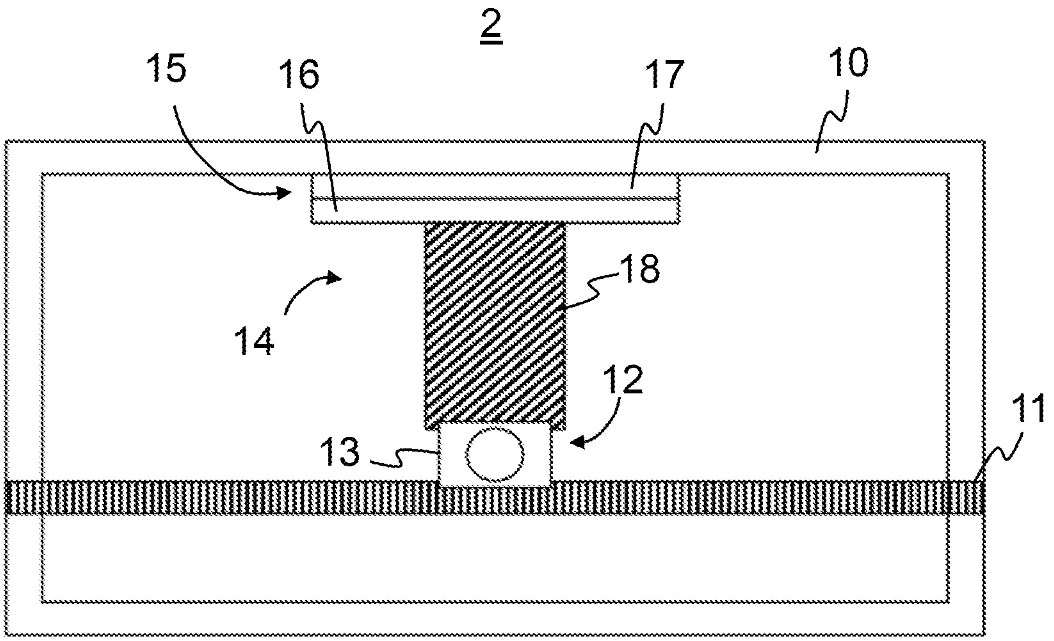
FIG. 3*a* shows a simplified schematic cross-sectional view of a first configuration of a control apparatus according to the embodiment.

A terminal assembly according to the embodiment for the control apparatus 2 is depicted in FIG. 3*a*. The terminal assembly according to the embodiment comprises the terminal connector 12 (for example, a plug connection or plug connector for attaching an in particular shielded cable or the like) which comprises a shield 13. Furthermore, a connection device 14 is provided in order to capacitively connect the shield 13 and the housing 10. The connection device 14 is manufactured from electrically conductive material (e.g., metal or the like) and contacts the shield 13 of the terminal connector 12 directly with one side (i.e., a first conductive contact) and the grounding part or the housing 10 with a second side, wherein an insulation pad 15 is provided for contacting on said end of the connection device 14. The insulation pad 15 comprises two films or layers: an electrically conductive layer 16 which is arranged on the body 18 of the connection device 14 (e.g., the layer 16 can be an adhesive layer or the like, by means of which the layer 16 can be affixed to the connecting device 14) and an insulating layer 17 which is at least substantially non-electrically conductive and contacts the housing 10 (i.e., a second non-conductive or insulating contact; e.g., the layer 17 can be an adhesive layer which can be affixed to the housing 10). A capacitive connection is created by said assembly (insulating film between the electrically conductive connection device 14 and the housing 10) since said capacitive connection is based on a similar operating principle to that of a capacitor. The connection device 14 itself or the body 18 of the connection device 14 can, for example, be configured as a continuous metal body, as a metallized plastic body or electrically conductive foam.

Figure 3B:
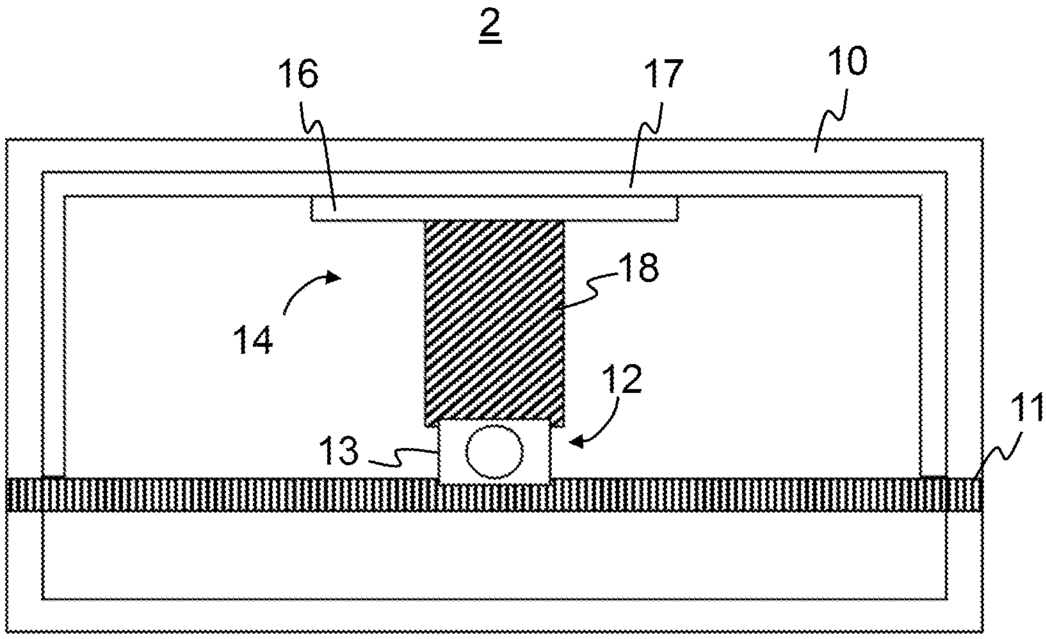
FIG. 3*b* shows a simplified schematic cross-sectional view of a second configuration of a control apparatus according to the embodiment.

Furthermore, FIG. 3*b* shows a terminal assembly according to the embodiment for the control apparatus 2, in which an insulating layer 17 is configured in a circumferential manner.

The shield 13 of the shielded connector 12 includes a galvanic connection with low impedance to the connection device 14 or the layer 16. The connection device 14 or the connection with low impedance between the connector shield 13 and the electrically conductive layer 16 can be implemented, e.g., via a spring, via electrically conductive foams, electrically conductive adhesive bands, press-fit adapters and the like. In order to guarantee a sufficiently low impedance of said connection, multiple connections can also be provided between the connector and conductive housing (with up to 360° around the connector). Various mechanical connections with low impedance are sufficiently known from the prior art.

Figure 4:
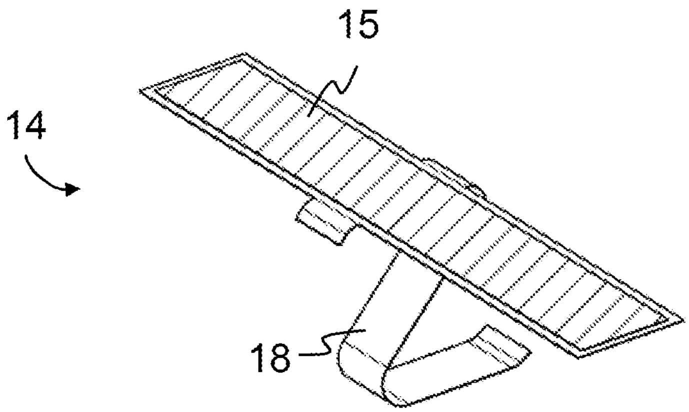
FIG. 4 shows a simplified diagram of a configuration of a spring-shaped connection device according to the embodiment.
Figure 5:
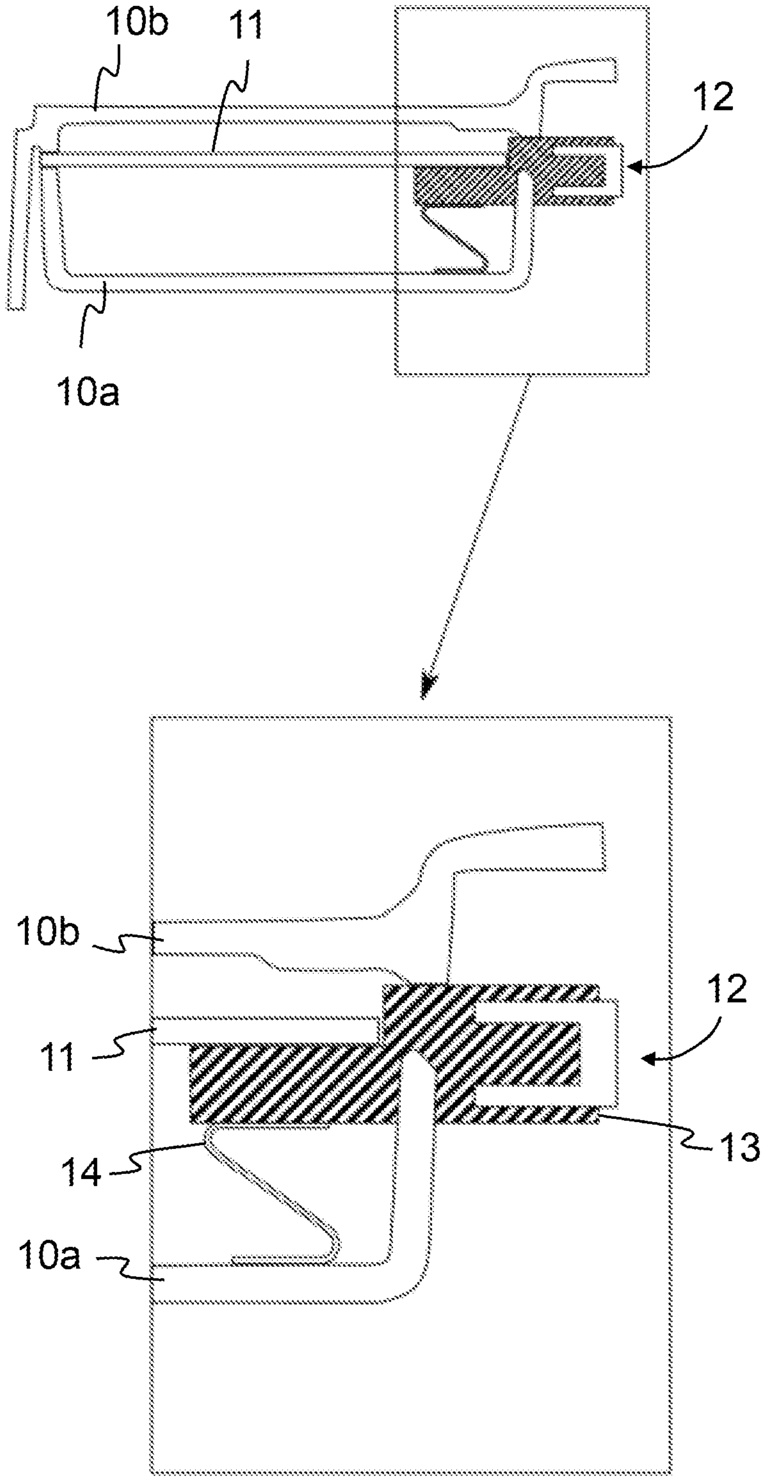
FIG. 5 shows a simplified schematic cross-sectional view of a further configuration of a control apparatus according to the embodiment.

According to a preferred configuration of the embodiment, the body 18 of the connection device 14 can also be configured as a spring, as shown in FIG. 4*a*. In this case, the body 18 is produced, e.g., from electrically conductive metal and consequently has, on the first side, an electrically conductive contact surface (first electrically conductive contact) which can be brought into contact with the shield 13. An insulation pad 15 or an insulating layer 17, which is, for example, glued, vapor-deposited or the like, and arranged on the housing 10 (second insulating contact), is arranged on the opposite side of the spring. In FIG. 5, a cross-sectional view of a control apparatus is shown, in which the spring-shaped connection device 14 is arranged between the upper shell 10*a* of the housing 10 and the shield 13 of the connector 12. Said spring-shaped connection device is pre-stressed by the spring force of the spring in such a way that the first conductive contact, in this case, towards the shield 13 and the second insulating contact towards the housing 10 are subjected to spring force, so that these are secured, e.g., against slipping of the spring. As a result, the connection and the security are additionally improved.

The connection with low impedance is not established directly via the conductive housing 10, but rather via the insulation layer or insulating layer 17 (i.e., via the additional insulation pad 15). Such an insulation pad 15 can either comprise only one insulating layer 17 or an electrically conductive material on a first side and an, in particular, thin (a few μm, in particular <100 μm, up to mm) insulation layer or insulating layer 17 on a second side. The shield 13 of the connector 12 is connected with low impedance with the conductive layer 16 of the isolation pad. Furthermore, the housing 10 and the conductive material of the isolation pad 15 are capacitively connected with an insulation layer or insulating layer 16 therebetween. In order to guarantee a sufficiently large capacitance, the insulating layer 17 must be selected to be sufficiently thin. The shape of the insulation pad 15 is configured in such a way that the impedance is low enough for the corresponding frequency range. The aspects of the embodiments can be used, in a practical manner, for all types of connections and circuit boards to housings.

The invention claimed is:

1. A terminal assembly comprising
- a terminal connector having a shield;
- a grounding part; and
- a connection device capacitively connecting the shield and the grounding part, wherein the connection device comprises:
  - a first electrically conductive contact,
  - a second insulating contact, and
  - a spring or a gasket comprising a conductive coating as the first electrically conductive contact;
- wherein a first contact of the first electrically conductive contact and the second insulating contact contacts the shield and a second contact of the first electrically conductive contact and the second insulating contact contacts the grounding part, and
- wherein the spring or the gasket exerts a spring force on the first contact toward the shield and exerts the spring force on the second contact toward the grounding part thereby securing the connection device against slipping.

2. The terminal assembly according to claim 1, wherein the connection device one of:
- contacts the shield via the first electrically conductive contact and the grounding part via the second insulating contact, and
- contacts the grounding part via the first electrically conductive contact and the shield via the second insulating contact.

3. The terminal assembly according to claim 1, wherein the connection device comprises an insulation pad provided as the second insulating contact.

4. The terminal assembly according to claim 3, wherein the insulation pad comprises a first electrically conductive layer provided as the first electrically conductive contact and a second insulating layer provided as the second insulating contact.

5. The terminal assembly according to claim 1, wherein the connection device comprises a body, wherein the body is electrically conductive and one side of the body is provided as the first contact, and
- wherein an insulating surface, film or layer is arranged on the opposite side of the body as the second insulating contact, or is non-electrically conductive and one side of the body is provided as the second contact, and a surface, film or layer is arranged on the opposite side of the body as the first contact.

6. The terminal assembly according to claim 5, wherein the body comprises electrically conductive material, and the insulating layer comprises non-electrically conductive material.

7. The terminal assembly according to claim 6, wherein the electrically conductive material is metal, and the non-electrically conductive material is plastic.

8. The terminal assembly according to claim 6, wherein the electrically conductive material is metal, and the non-electrically conductive material is applied by varnishing.

9. The terminal assembly according to claim 1, wherein the spring force is exerted on the first contact toward the shield in a first direction and is exerted on the second contact toward the grounding part in a second direction that is opposite to the first direction.

* * * * *